(12) United States Patent (10) Patent No.: US 6,286,799 B1
Fujii (45) Date of Patent: Sep. 11, 2001

(54) SLIDE DEVICE FOR VEHICLE SEAT

(75) Inventor: Hirotoshi Fujii, Hiroshima-ken (JP)

(73) Assignee: Toyo Seat Co., Ltd. (JP)

( * ) Notice: Subject to any disclaimer, the term of this patent is extended or adjusted under 35 U.S.C. 154(b) by 0 days.

(21) Appl. No.: 09/530,700

(22) PCT Filed: Sep. 7, 1999

(86) PCT No.: PCT/JP99/04852

§ 371 Date: May 4, 2000

§ 102(e) Date: May 4, 2000

(87) PCT Pub. No.: WO00/15458

PCT Pub. Date: Mar. 23, 2000

(30) Foreign Application Priority Data

Sep. 16, 1998 (JP) .................................................. 10-261169

(51) Int. Cl.⁷ .................................................. F16M 13/00
(52) U.S. Cl. .................................................. 248/430
(58) Field of Search .................................. 248/430, 429, 248/424; 297/311, 344.1

(56) References Cited

U.S. PATENT DOCUMENTS

| 5,524,504 | 6/1996 | Brandoli et al. ........................ 74/527 |
| 5,775,662 | * 7/1998 | Hoshihara et al. .................. 248/429 |
| 6,152,415 | * 11/2000 | Seki et al. ............................ 428/430 |
| 6,193,203 | * 2/2001 | Ikegaya et al. ...................... 248/429 |

FOREIGN PATENT DOCUMENTS

| 03178835 | 8/1991 | (JP) . |
| 0195964 | 1/1995 | (JP) . |
| 09267676 | 10/1997 | (JP) . |

* cited by examiner

*Primary Examiner*—Ramon O. Ramirez
(74) *Attorney, Agent, or Firm*—Lorusso & Loud

(57) ABSTRACT

A slide device for a vehicle seat, including a C-shaped lower rail (2), an upper rail (3), a slide lock (4) displaceable between an unlock position and a lock position. At the unlock position, the slide lock (4) is disengaged with the lower rail (2) to permit the longitudinal movement of the upper rail (3) relative to the lower rail (2), while at the lock position the slide lock is engaged with the lower rail (2) to prevent the longitudinal movement of the upper rail (3) relative to the lower rail (2).

1 Claim, 6 Drawing Sheets

SLIDE DEVICE FOR VEHICLE SEAT

TECHNICAL FIELD

This invention relates to a slide device for a vehicle seat.

BACKGROUND ART

JP-A-H3-178835 discloses a slide mechanism for a vehicle seat having, as shown in FIGS. 5 and 6, a C-shaped lower rail 50 fixedly disposed on a vehicle body, an upper rail 51 fixed on the seat and slidably inserted in the lower rail 50 along the longitudinal direction of the lower rail 50, and a slide lock member 60 operable to maintain the lower rail 50 and the upper rail 51 in a lock state or an unlock state.

The lower rail 50 has a bottom wall 53, a pair of side walls 52 and 52 extending from respective opposite side edges of the bottom wall 53 in a direction perpendicular to the bottom wall 53, top walls 56 and 56 extending inwardly from respective top edges of the side walls 52 and 52, and dependent walls 54 extending towards the bottom wall 53 from respective edges of the top walls 56 and 56. The upper rail 51 is anchor-like shape in cross-section and has an upright wall 57 lying perpendicular to the lower rail 50 and a pair of U-shaped walls 55 and 55 branched from the upright wall 52 and received in the lower rail 50.

The vertical wall 52 of the lower rail 50 is provided with a plurality of openings 61 arranged in the longitudinal direction. The U-shaped wall 55 of the upper rail 51 has a hook portion provided with a plurality of openings 62. The lock member 60 has three claws 63 which are adapted to simultaneously engage with the openings 61 and 62 of the lower rail 50 and upper rail 51, so that the longitudinal slide movement of the upper rail 51 relative to the lower rail 50 is locked.

With the above construction, when a tensile force, for example, from the seat belt, is applied to the upper rail 51, the upper edge 55a of each of the paired U-shaped walls 55 and 55 is brought into engagement with an inside surface of the corresponding top wall 56, so as to support the upward load applied to the upper rail 51. Therefore, in order to ensure a sufficient supporting strength against such upward load, it is necessary to increase the thickness of the lower rail 50 and the upper rail 51. Thus, the conventional seat slide mechanism has a problem that the weight is increased and the production cost is high. Additionally, since the lock member 60 is designed to rotate about an axis, it is necessary to ensure a space for the rotation thereof.

The present invention has been made to overcome the problems of the conventional technique.

DISCLOSURE OF THE INVENTION

In accordance with the present invention there is provided a slide device for a vehicle seat, comprising:

a C-shaped lower rail (2) including a bottom wall (21) extending widthwise of the lower rail (2), first and second side walls (22a, 22b) extending from respective opposite side edges of the bottom wall (21) in a direction perpendicular to the bottom wall (21), first and second top walls (23a, 23b) extending inwardly from respective top edges of the first and second side walls (22a, 22b) and terminating spaced a distance from each other, and first and second dependent walls (24a, 24b) extending towards the bottom wall (21) from respective edges of the first and second top walls (23a, 23b) and defining a space (26) therebetween;

an upper rail (3) mounted on the lower rail (2) for sliding movement relative to the lower rail (2) and including an upright wall (3a, 31a, 32a) lying perpendicular to the lower rail (2), and a pair of first and second U-shaped walls (31b, 32b) branched from the upright wall (3a, 31a, 32a) and received in the lower rail (2), the first U-shaped wall (31b) including a vertical wall ($31b_1$) extending from the upright wall (3a, 31a, 32a), a bottom wall ($31b_3$) extending laterally outwardly towards the first side wall (22a) of the lower rail (2) from a lower edge of the vertical wall ($31b_1$), and an upturned wall ($31b_2$) extending in parallel with the vertical wall ($31b_1$) from a side edge of the bottom wall ($31b_3$), the first and second U-shaped walls (31b, 32b) being arranged so that the vertical wall ($31b_1$) is located in said space (26) between the first and second dependent walls (24a, 24b) with the upturned wall ($31b_2$) being located between the first dependent wall (24a) and the first side wall (22a) and with the second dependent wall (24b) being located within the second U-shaped wall (32b), the first dependent wall (24a) having a lower edge provided with a plurality of downwardly extending teeth (25), the vertical wall ($31b_1$) having at least one aperture (35) shaped to define an upwardly extending inner tooth (33), the upturned wall ($31b_2$) having at least one upwardly extending outer tooth (34);

a slide lock means (4) having at least one plate (44) laterally extending through the aperture (35) in a direction perpendicular to the vertical wall ($31b_1$) and provided with an opening (5) with which the inner and outer teeth (33, 34) of the vertical wall ($31b_1$) and the upturned wall ($31b_2$) are fitted so that the lock means (4) is moveable together with the lower rail (2), the lock means (4) being displaceable between a lower, unlock position at which the opening (5) of the plate (44) is disengaged with the teeth (25) of the first depending wall (24a) of the lower rail (2) to permit the longitudinal movement of the upper rail (3) relative to the lower rail (2) and an upper, lock position at which the opening (5) of the plate (44) is engaged with one of the teeth (25) of the first depending wall (24a) of the lower rail (2) to prevent the longitudinal movement of the upper rail (3) relative to the lower rail (2); and means (6, 7, 8, 9) for displacing the lock means (4) between the lock position and the unlock position.

The slide device for a vehicle seat according to the present invention will be described below with reference to the accompanying drawings, in which:

DETAILED DESCRIPTION OF THE INVENTION

Figure 1:
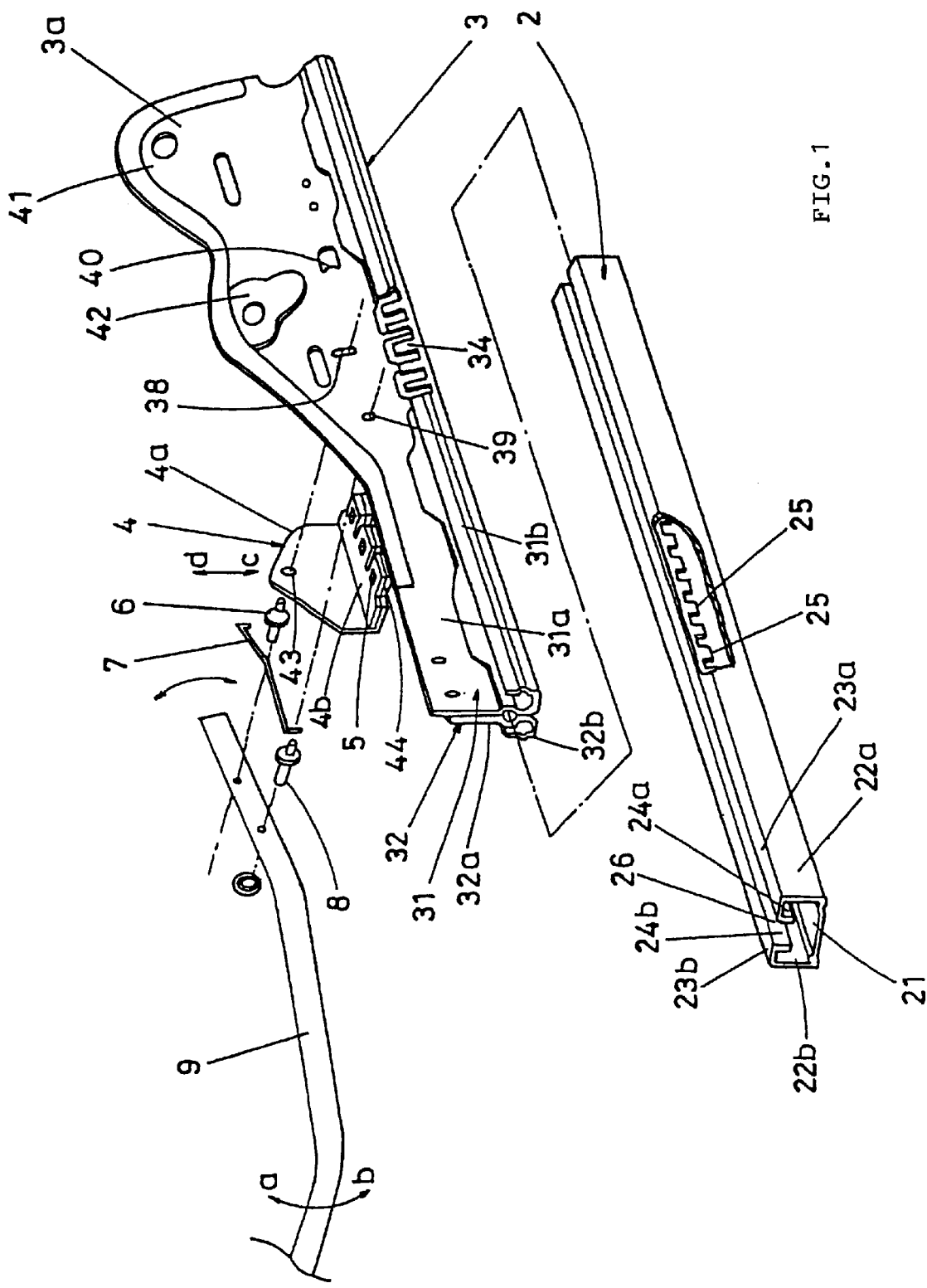
FIG. 1 is an exploded perspective view diagrammatically illustrating a slide device for a vehicle seat according to the present invention.

In the following description of the preferred embodiment of the present invention, it is to be noted that since a slide device for a vehicle seat generally comprises a pair of left and right slide rail assemblies having the same construction and disposed on both left and right sides of underside of the seat for supporting the seat such that the seat is displaceable relative to the vehicle body in the fore and aft direction thereof, the following description will be made with regard to only one of the slide rail assemblies, i.e. left rail assembly, on the preferred embodiment thereof.

Referring to FIGS. 1–4, the seat slide device is fixedly disposed on the vehicle floor through a suitable bracket (not shown) and is arranged in the fore and aft direction of the vehicle. Designated generally as 2 is a C-shaped lower rail including a bottom wall 21 extending widthwise of the lower rail 2 and serving as a fixing surface for the vehicle body. The lower rail 2 also includes first and second side walls 22a and 22b extending from respective opposite side edges of the bottom wall 21 in a direction perpendicular to the bottom wall 21, first and second top walls 23a and 23b extending inwardly from respective top edges of the first and second side walls 22a and 22b and terminating spaced a distance from each other, and first and second dependent walls 24a and 24b extending towards the bottom wall 21 from respective edges of the first and second top walls 23a, 23b and defining a space 26 therebetween.

As best seen in FIG. 1, the first dependent wall 24a has a plurality of downwardly extending teeth 25, 25 . . . arranged at a predetermined interval. In the illustrated embodiment, the plurality of teeth 25, 25 . . . are constructed by residual portions obtained by cutting away rectangular parallelepiped portions from the lower edge portion of the first dependent wall 24a.

Designated generally as 3 is an upper rail 3 fitted in the lower rail 2 for sliding movement relative to the lower rail 2 and including an upright wall 3a lying perpendicular to the lower rail 2, and a pair of first and second U-shaped walls 31b and 32b branched from the upright wall 3a and received in the lower rail 2.

Figure 2:
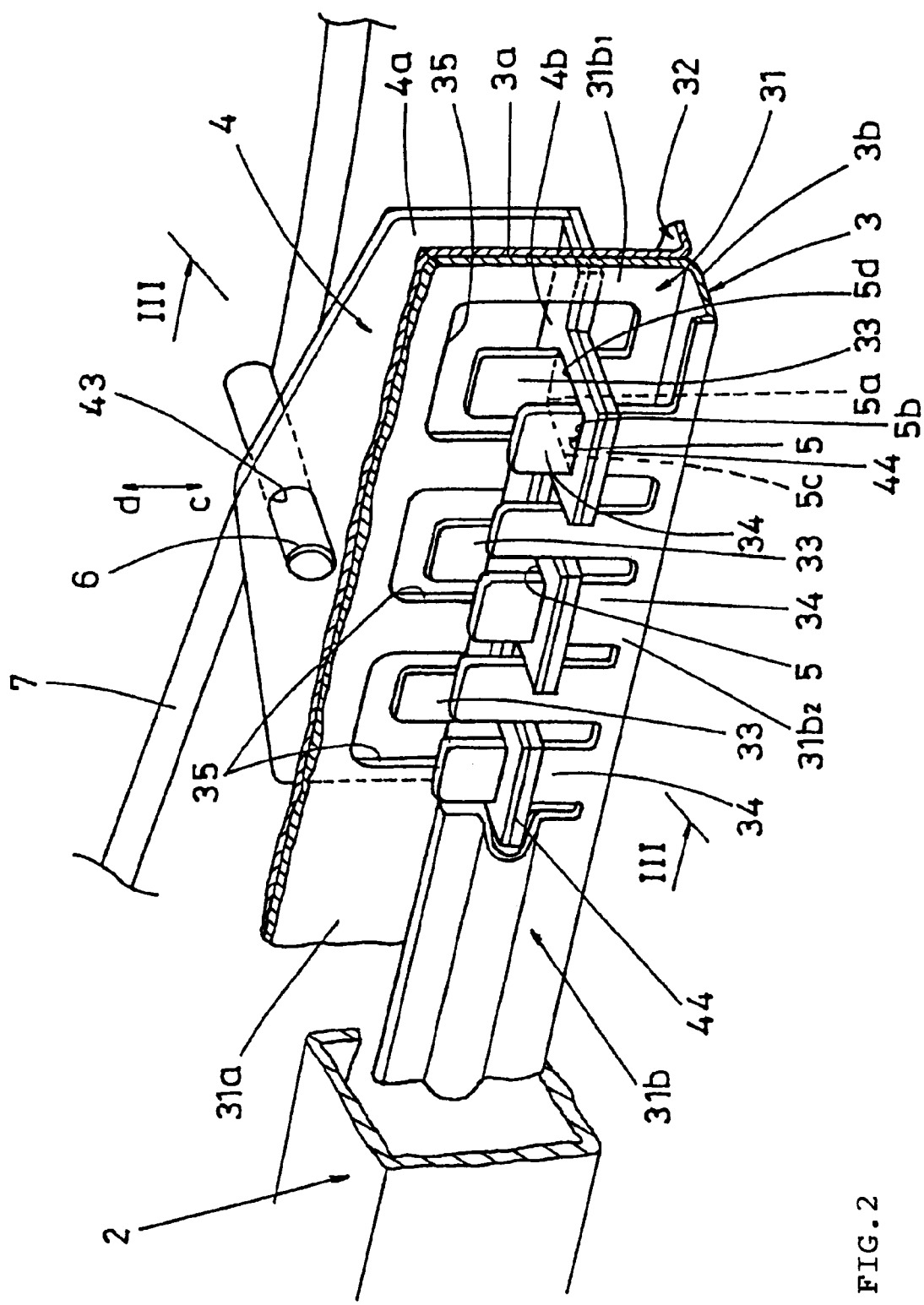
FIG. 2 is an enlarged perspective view, cut away in part, diagrammatically illustrating a slide lock mechanism of the slide device of FIG. 1.
Figure 3:
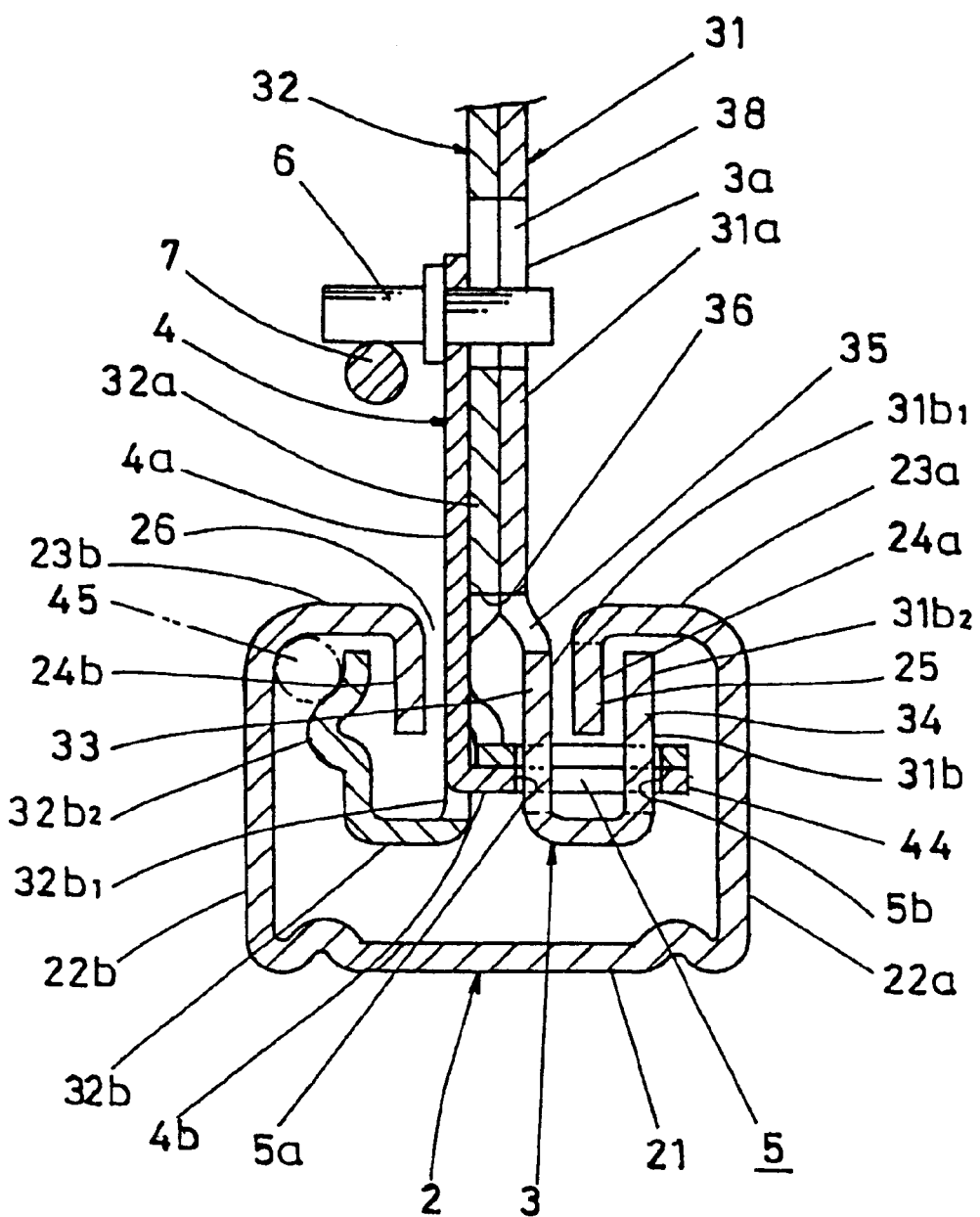
FIG. 3 is a sectional view taken along the line III—III in FIG. 2 and showing an unlock state of the slide device.

As shown in FIGS. 1–4, the upper rail 3 is constructed by integrally bonding hereinafter described first and second members 31 and 32 to each other. The first member 31 is constituted of a first upright wall 31a formed from a plate having a width which varies in the longitudinal direction from its one end to the other end, and the first U-shaped wall 31b contiguous to a lower end of the first upright wall 31a. As best seen in FIG. 3, the first U-shaped wall 31b has a vertical wall $31b_1$ extending from the upright wall 31a, a bottom wall $31b_3$ extending, in a predetermined distance, laterally outwardly towards the first side wall 22a of the lower rail 2 from a lower edge of the vertical wall $31b_1$, and an upturned wall $31b_2$ extending in parallel with the vertical wall $31b_1$ from a side edge of the bottom wall $31b_3$.

The first and second U-shaped walls 31b and 32b are arranged so that the vertical wall $31b_1$ is located in the space 26 between the first and second dependent walls 24a and 24b with the upturned wall $31b_2$ being located between the first dependent wall 24a and the first side wall 22a and with the second dependent wall 24b being located within the second U-shaped wall 32b.

The first vertical wall $31b_1$ has at least one aperture 35 shaped to define an upwardly extending inner tooth 33. More particularly, as shown in FIG. 2, three openings 35 are formed by cutting away bold U-shaped portions at a predetermined interval in a nearly middle portion of the first vertical wall $31b_1$ along the longitudinal direction thereof. The remaining portions which extend upward from the lower ends of the openings 35 represent the inner teeth 33.

The upturned wall $31b_2$ facing the first vertical wall $31b_1$ has three upwardly extending outer teeth 34 facing the inner teeth 33. The outer teeth 34 are formed by cutting upper edge portions of the upturned wall $31b_2$.

Similar to the first member 31, the second member 32 is constituted of an upright wall 32a of a nearly rectangular parallelepiped shape, and the second U-shaped wall 32b contiguous to a lower end of the upright wall 32a. The second U-shaped wall 32b has a vertical wall $32b_1$ and an upturned wall $32b_2$ provided opposite thereto with a predetermined space therebetween. The second member 32 is provided with rectangular parallelepiped apertures 36 (see FIGS. 3 and 4) at positions corresponding to the openings 35 of the first member 31 so as to enable attachment and movement of a lock plate 4 which will be described hereinafter.

Figure 4:
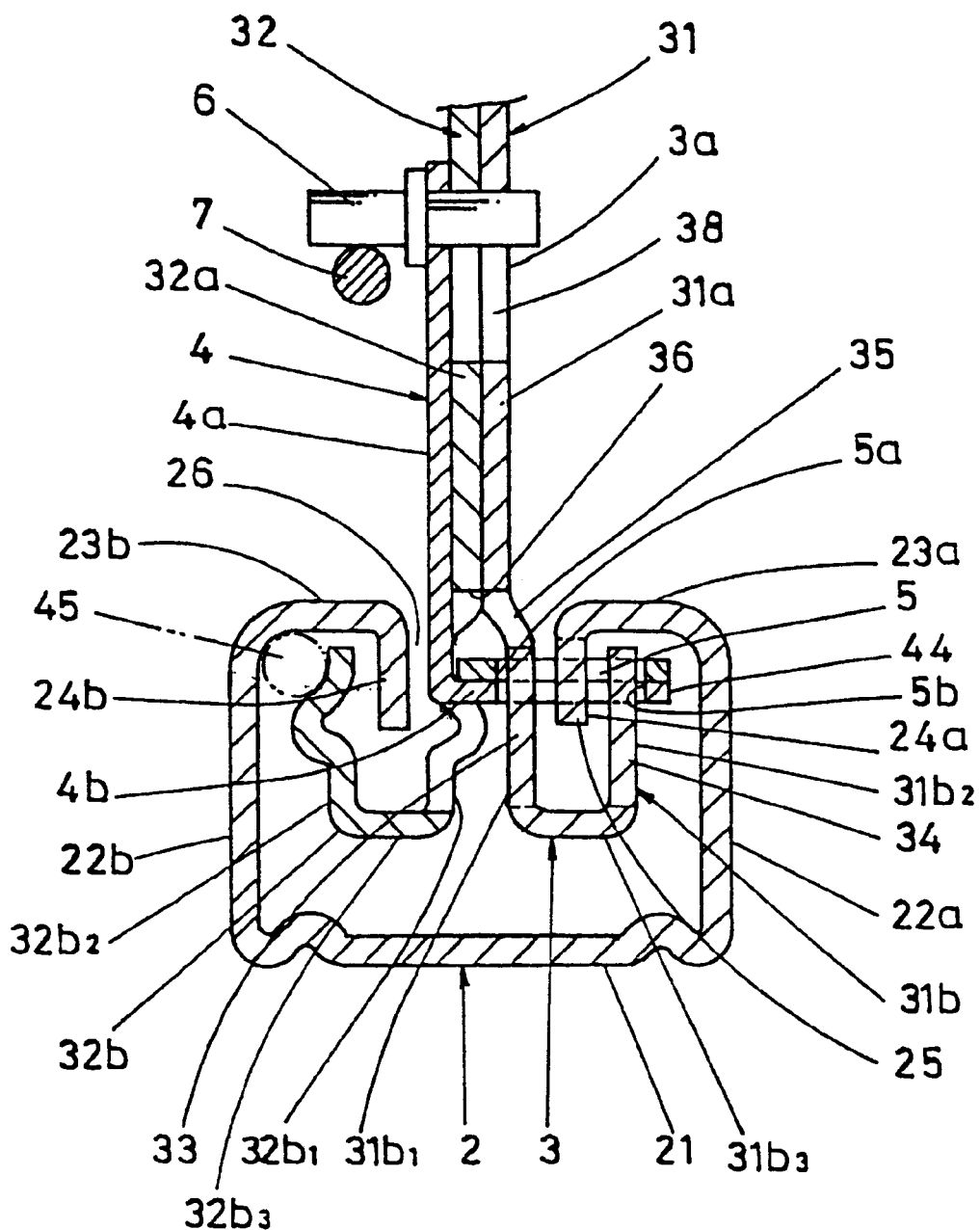
FIG. 4 is a sectional view showing a lock state of the slide device.
Figure 5:
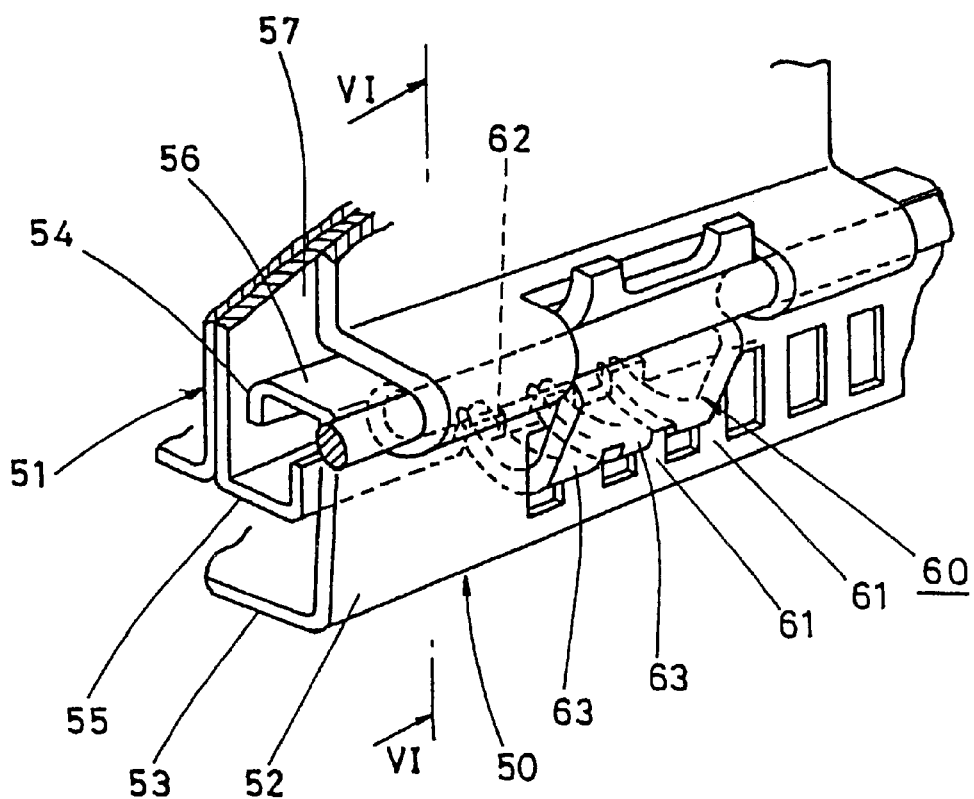
FIG. 5 is an enlarged perspective view, cut away in part, diagrammatically illustrating a conventional slide rail.
Figure 6:
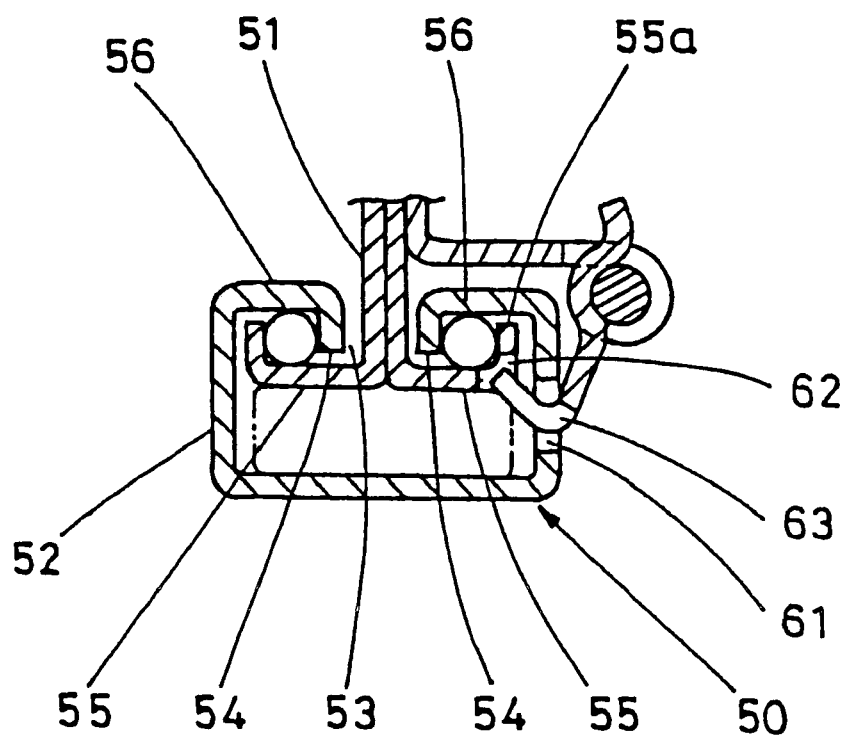
FIG. 6 is a sectional view taken along the line VI—VI in FIG. 5.

The first and second members 31 and 32 thus constructed are joined back to back and integrally fixed by welding to form the above-described upper rail 3. The upright wall 31a of the first member 31 and the upright wall 32a of the second member 32 constitute the plate-like upright wall 3a of the upper rail 3. As shown in FIG. 1, the upright wall 3a has a rear portion provided with a seat back mounting section 41 for mounting a seat back (not shown) and a seat belt mounting section 42 for mounting a seat belt (not shown) . Further, the upright wall 3a is provided with a slot 38 formed of an elongated hole extending vertically above the inner and outer teeth 33 and 34, and with a pin hole 39 and an engaging portion 40 (cut and raised portion) on both sides of the slot 38. Preferably, the upper rail 3 is made slidable smoothly in the lower rail 2 with its side edges being guided and retained using two rows of a plurality of balls 45 (only one raw of balls on the second U-shaped wall 32b side is shown in FIGS. 3 and 4).

Referring to FIG. 2, designated generally as 4 is a slide lock means 4 having at least one plate 44 laterally extending through the aperture 35 in a direction perpendicular to the vertical wall $31b_1$ and provided with an opening 5 with which the inner 33 of the vertical wall $31b_1$ and the outer teeth 34 of the upturned wall $31b_2$ are fitted so that the lock means 4 is moveable together with the lower rail 2.

The slide lock means 4 is constructed from a plate bent into a nearly L-shaped form and includes a vertical plate section 4a and a horizontal plate section 4b. The vertical plate section 4a is provided with a pin hole 43 at its upper portion. The horizontal plate section 4b is provided with three plates 4 each having an opening 5. The number of the plates 4 corresponds to the number of the inner teeth 33 and the number of the outer teeth 34 of the upper rail 3. Each of the plates 4 has a width sufficient to be inserted into the aperture 35. The opening 5 has a size such that the distance between opposing sides 5a and 5b in the lateral direction of the upper rail 3 is greater by a predetermined length than the distance between the outer surfaces of the inner and outer teeth 33 and 34 (namely, the outer size of the first U-shaped wall 31b) of the upper rail 3, and that the distance between opposing sides 5c and 5d in the direction of the upper rail 3 is greater by a predetermined length than the widths of the respective teeth 33 and 34. Thus, each of the teeth 33 and 34 can be inserted into the opening 5.

Thus, the plate 44 is allowed to pass through an upper part of each opening 35 and extend through the upright wall 3a of the upper rail 3 from the first member 31 to the second member 32. Then, the inner and outer teeth 33 and 34 are fitted in the openings 5. In this case, depending upon the position of the plate 44, the teeth 25 of the first dependent wall 24a of the lower rail 2 is engaged by or disengaged from the opening 5.

Namely, the slide lock means 4 is displaceable between a lower, unlock position and an upper, lock position. At the unlock position, the opening 5 is disengaged from the teeth 25 of the lower rail 2, as shown in FIG. 3, to permit the longitudinal movement of the upper rail 3 relative to the lower rail 2. At the lock position, the opening 5 is engaged with one of the teeth 25, as shown in FIG. 4, to prevent the longitudinal movement of the upper rail 3 relative to the lower rail 2.

Means is provided for displacing the lock means 4 between the lock position and the unlock position. As shown in FIG. 1, the slide lock means 4 is mounted on the upper rail 3 by inserting a supporting pin 6 through the pin hole 43 of the slide lock means 4 and through the pin slot 38 of the lower rail 2. As a consequence, the slide lock means 4 is displaceable by a movement of the supporting pin 6 in the direction of the elongation of the slot 38 (namely in the up and down directions).

As shown in FIGS. 1 and 2, the supporting pin 6 is engaged by an intermediate portion of a torsion bar 7 having one end supported by a fulcrum pin 8 fitted into the pin hole 39 and the other end supported by the engaging portion 40. Designated as 9 is a lock operating lever pivoted to the upright wall 3a and having a portion, opposite to a handling portion, to which the supporting pin 6 is received. As a consequence, when the lock operating lever is moved in a-b direction as shown by the arrow, the slide lock means 4 is displaced in c-d direction as shown by the arrow through the torsion bar 7, so that the slide lock means 4 is selectively maintained in the lock or unlock state. More particularly, when the lock operating lever 7 is driven in the direction a shown by the arrow, the lock plate 4 is displaced in the direction c (downward) through the torsion bar 7 to assume the unlock state as shown in FIG. 3. When the lock operating lever 9 is driven in the direction b shown the arrow, the lock plate 4 is displaced in the direction d shown by the arrow (upward) through the torsion bar 7 to assume the lock state as shown in FIG. 4.

In the condition of the seat in use where the slide lock means 4 is maintained in the lock state, when an upward load such as a tensile force from the seat belt, is applied to the upper rail 3, the upper edge of the upturned wall $31b_2$ of the first U-shaped wall 31b of the upper rail 3 is brought into engagement with an inside surface of the top wall 23a of the lower rail 2 so that the upward movement of the upper rail is restricted.

In this case, due to the upward load applied to the top wall 23a of the lower rail 2 by the upturned wall $31b_2$ of the upper rail 3, such a force that would upwardly deform the top wall 23a is applied to the lower rail 2. Also, such a force that would spread and deform the U-shaped wall 31b is acted on the upper rail 3. Therefore, the upward and downward connection between the lower rail 2 and the upper rail 3 would tend to be adversely affected.

However, since the inner teeth 33 formed in the vertical wall $31b_1$ and the outer teeth 34 formed in the upturned wall $31b_2$ of the upper rail 3 are positioned adjacent to the edges 5a and 5b, respectively, of the opening 5 of the plate 44, the inner teeth 33 and the outer teeth 34 are brought into engagement with the edges 5a and 5b, respectively, even when the U-shaped wall 31b is subjected to a spreading and deforming force. Therefore, the spreading and deformation of the inner and outer teeth 33 and 34 are prevented and, therefore, the spreading and deformation of the U-shaped wall 31b are prevented. Thus, in the lower rail 2, the depending wall 24a and 24b, when subjected to an upward deforming force, are surely brought into engagement with the vertical walls $31b_1$ and $32b_1$ and are prevented from being further deformed.

As described in the foregoing, with the seat slide device according to the present invention, since a slide lock mechanism including the inner teeth 33 and outer teeth 34 of the upper rail 3, the teeth 25 of the lower rail 2, and the slide lock means 4 serves to exhibit a function (reinforcing function) of restricting deformation of the upper rail 3 and the lower rail 2 as well as a function of slide locking, the thickness of the plate material from which the lower rail 2 and upper rail 3 are formed can be made thin, so that the weight and costs of the slide device can be reduced. Further, the connecting condition between the upper rail 3 and the lower rail 2 can be maintained good, even when an upward load is applied to the upper rail 3. Thus, the reliability of the operation of the slide lock mechanism is improved. Moreover, since the displacement of the slide lock means 4 between unlock and lock positions is upward and downward motion within the lower rail 2, there is no need of providing a special space therefor. Therefore, as compared with the conventional device, the device of the present invention is more compact.

What is claimed is:

1. A slide device for a vehicle seat, comprising:
   a C-shaped lower rail (2) including a bottom wall (21) extending widthwise of said lower rail (2), first and second side walls (22a, 22b) extending from respective opposite side edges of said bottom wall (21) in a direction perpendicular to said bottom wall (21), first and second top walls (23a, 23b) extending inwardly from respective top edges of said first and second side walls (22a, 22b) and terminating spaced a distance from each other, and first and second dependent walls (24a, 24b) extending towards said bottom wall (21) from respective edges of said first and second top walls (23a, 23b) and defining a space (26) therebetween;
   an upper rail (3) mounted on said lower rail (2) for sliding movement relative to said lower rail (2) and including an upright wall (3a, 31a, 32a) lying perpendicular to said lower rail (2), and a pair of first and second U-shaped walls (31b, 32b) branched from said upright wall (3a, 31a, 32a) and received in said lower rail (2),
   said first U-shaped wall (31b) including a vertical wall ($31b_1$) extending from said upright wall (3a, 31a, 32a), a bottom wall ($31b_3$) extending laterally outwardly towards said first side wall (22a) of said lower rail (2) from a lower edge of said vertical wall ($31b_1$), and an upturned wall ($31b_2$) extending in parallel with said vertical wall ($31b_1$) from a side edge of said bottom wall ($31b_3$),
   said first and second U-shaped walls (31b, 32b) being arranged so that said vertical wall ($31b_1$) is located in said space (26) between said first and second dependent walls (24a, 24b) with said upturned wall ($31b_2$) being located between said first dependent wall (24a) and said first side wall (22a) and with said second dependent wall (24b) being located within said second U-shaped wall (32b),
   said first dependent wall (24a) having a lower edge provided with a plurality of downwardly extending teeth (25), said vertical wall (31b₁) having at least one aperture (35) shaped to define an upwardly extending inner tooth (33), said upturned wall (31b₂) having at least one upwardly extending outer tooth (34);

a slide lock means (4) having at least one plate (44) laterally extending through said aperture (35) in a direction perpendicular to said vertical wall (31b₁) and provided with an opening (5) with which said inner and outer teeth (33, 34) of said vertical wall (31b₁) and said upturned wall (31b₂) are fitted so that said lock means (4) is moveable together with said lower rail (2), said lock means (4) being displaceable between a lower, unlock position at which said opening (5) of said plate (44) is disengaged with said teeth (25) of said first depending wall (24a) of said lower rail (2) to permit the longitudinal movement of said upper rail (3) relative to said lower rail (2) and an upper, lock position at which said opening (5) of said plate (44) is engaged with one of said teeth (25) of said first depending wall (24a) of said lower rail (2) to prevent the longitudinal movement of said upper rail (3) relative to said lower rail (2); and means (6, 7, 8, 9) for displacing said lock means (4) between said lock position and said unlock position.

* * * * *